United States Patent
Shen et al.

(10) Patent No.: US 6,741,637 B1
(45) Date of Patent: May 25, 2004

(54) METHOD AND APPARATUS OF JOINT DETECTION OF A CDMA RECEIVER

(75) Inventors: Jiang Shen, Anhui (CN); Gang Yang, Eatontown, NJ (US)

(73) Assignee: Golden Bridge Technology, Inc., West Long Branch, NJ (US)

( * ) Notice: Subject to any disclaimer, the term of this patent is extended or adjusted under 35 U.S.C. 154(b) by 803 days.

(21) Appl. No.: 09/598,469

(22) Filed: Jun. 22, 2000

(51) Int. Cl.$^7$ ................................................ H04L 1/707
(52) U.S. Cl. ........................................................ 375/149
(58) Field of Search ................................ 375/142, 143, 375/144, 145, 148, 149, 150, 347, 349; 370/335, 441

(56) References Cited

U.S. PATENT DOCUMENTS

| | | |
|---|---|---|
| 5,644,592 A | 7/1997 | Divsalar et al. |
| 5,719,852 A | 2/1998 | Schilling et al. |
| 5,757,791 A | 5/1998 | Kanterakis et al. |
| 5,862,133 A | 1/1999 | Schilling |
| 6,091,761 A * | 7/2000 | Popovic ....................... 375/150 |

OTHER PUBLICATIONS de Campos et al, "Contrained Quasi–Newtonian Algorithm for CDMA Moble Communications," 1998, IEEE.*

Subramanian et al, "Performance of a Quasi–Newtonian Adaptive Filtering Algorithm for a CDMA indoor Wireless System," 1995, IEEE.*

Vliese et al, "Performance of Adaptation Algorithms in Multipath Channel Equalization for CDMA systems," 1999, IEEE□□.*

Marshall et al, "A Fast Quasi–Newtonian Adaptive Filtering Algorithm," 1992, IEEE.*

Mathematical Programming Glossary—D, http://www.cudenver.edu/~hgreenbe/glossary/D.html, printed on Jun. 2, 2000.

Mathematical Programming Glossary—H, http/www.cudever.edu/~hgreenbe/glossary/H.html, printed Jun. 5, 2000.

Molecular Interactions Unit: Energy Minimization, M. Sc. Molecular Modelling, Department of Crystallography, Birkbeck College, http://www.biochemistry.bham.ac.uk/osmart/msc/lect/lect3b.html, printed on Jun. 2, 2000.

Optimization methods, University of Jyvaskyla Scientific Visulaization, http://www.mit.jyu.fi/palvelut/tyoprojektit/ovi.methods.html, printed on Jun. 5, 2000.

* cited by examiner

Primary Examiner—Stephen Chin
Assistant Examiner—Kevin Kim
(74) Attorney, Agent, or Firm—McDermott, Will & Emery

(57) ABSTRACT

A demodulator system for a receiver in a multiple user-code spread-spectrum system, such as in a CDMA base station, utilizes a Quasi-Newtonian optimization routine to identify received codes and recover user data based on detected correlations between the received spread-spectrum signal and a set of the possible codes available to users of the system. The preferred optimization routine is a Davis-Fletcher-Powell (DFP) routine.

11 Claims, 3 Drawing Sheets

METHOD AND APPARATUS OF JOINT DETECTION OF A CDMA RECEIVER

FIELD OF THE INVENTION

The concepts involved in the present invention relate to detection of code sequence signals in multi-user spread-spectrum communications.

BACKGROUND

Mobile communication is becoming increasingly popular. The recent revolution in digital processing has enabled a rapid migration of mobile wireless services from analog communications to digital communications. For example, cellular service providers have already deployed substantial digital wireless communication infrastructure, much of which utilizes code division, multiple access (CDMA) technology. Increasingly, development efforts are focusing on techniques for high-capacity communication of digital information over wireless links, and much of this broadband wireless development work incorporates spread-spectrum communications similar to those used in CDMA.

Spread-spectrum is a method of modulation, like FM, that spreads a data signal for transmission over a bandwidth, which substantially exceeds the data transfer rate. Direct sequence spread-spectrum involves modulating a data signal onto a pseudo-random chip sequence. The chip sequence is the spreading code sequence, for spreading the data over a broad band of the spectrum. The spread-spectrum signal is transmitted as a radio wave over a communications media to the receiver. The receiver despreads the signal to recover the information data.

The attractive properties of these systems include resistance to multipath fading, soft handoffs between base stations, jam resistance, and frequency reuse. Frequency reuse, translates into potentially significant capacity increases over earlier systems. In addition, in a multipath environment, the use of RAKE receivers enables the harnessing of the total received energy.

Receiving the direct sequence spread spectrum communications requires detection of one or more spreading chip-code sequences embedded in an incoming spread-spectrum signal as well as subsequent synchronization of the receiver to the detected chip-code sequence. Initial detection and phase synchronization of the spreading chip code sequence (s) in the receiver is commonly known as code acquisition. Although simple correlators have been used in the code acquisition for reception of spread-spectrum signals, faster and more efficient techniques for code acquisition rely on matched filters.

A matched filter essentially matches elements or samples of an input signal to elements of a reference chip-code sequence signal, by multiplying a set of N samples of the input signal with the reference signal, then summing the product terms to determine a value of correlation of the set of samples of the input signal to the reference signal. For a single code, if the correlation value exceeds a threshold, then a decision circuit indicates that there is a match. If there are a plurality of possible codes, the receiver typically uses a bank of matched filters for parallel matching to a plurality of reference codes. If the receiver expects to receive only one transmission at a time, the decision processor selects the reference code having the highest correlation to the input samples as the match to the code contained in the received spread-spectrum signal.

In many applications, however two or more transmitters may transmit at the same time using different spreading codes. This is particularly common in a CDMA environment, although similar situations may arise in other types of communication using direct sequence spread spectrum. If two or more stations are transmitting at the same time, particularly if the receiver must receive the transmissions simultaneously, the receiver must search for and acquire multiple codes at the same time from within a broad-spectrum wireless signal. A number of techniques have been developed for reducing interference caused by signals from multiple transmitters and acquiring the spreading code of one or more of the transmitters from the spread-spectrum signals received over the air-link.

For example, U.S. Pat. No. 5,644,592 proposes a method of decoding a spread spectrum composite signal, involving despreading each coded signal and averaging each despread signal, which is analyzed to produce a tentative decision. The Divsalar method respreads and sums signals to produce combined interference signals, which are scaled and combined with a weighting factor, to produce a scaled combined interference signal. The method also entails scaling the composite signal with the weighting factor to produce a scaled composite signal and scaling the signal value by the complement of the weighting factor to produce a leakage signal. The scaled composite signal, the scaled combined interference signal and the leakage signal are combined to produce an estimate of a respective user signal.

U.S. Pat. No. 5,719,852 discloses a spread-spectrum interference canceler for reducing interference in a direct sequence CDMA receiver having N chip-code channels. The canceler includes a bank of correlators or matched filters, spread-spectrum-processing circuits, subtracting circuits, and channel correlators or channel-matched filters. Using a plurality of chip-code signals, the correlators despread the spread-spectrum CDMA signal. The spread-spectrum-processing circuits use a timed version of the chip-code signals, for spread-spectrum processing each of the despread signals with a respective chip-code-signal corresponding to a respective despread signal. For recovering a code channel using an ith chip-code-signal, the subtracting circuits subtract from the spread-spectrum CDMA signal, each of the N−1 spread-spectrum-processed-despread signals thereby generating a subtracted signal. The N−1 spread-spectrum-processed-despread signals do not include the spread-spectrum-processed-despread signal of the $i^{th}$ channel of the spread-spectrum CDMA signal. The channel correlator or channel-matched filter despreads the subtracted signal.

U.S. Pat. No. 5,757,791 discloses a multistage low-complexity linear receiver for DS-CDMA spread-spectrum communications. Each stage of the multistage linear receiver recreates the overall modulation, noiseless channel, and demodulation process. The outputs of these stages are then linearly combined. The combining weights may be chosen to implement different linear detectors, such as decorrelating and minimum means squared error (MMSE) detectors. Additional stages may be added to the multistage linear receiver to improve performance.

There are several disadvantages to the prior art code techniques. The prior techniques generally rely on multiple stages of correlation or matched filtering, and every stage needs signal regenerators. This requires a lot of hardware. Due to such hardware costs, implementation typically must be limited to three stages or iterations of the algorithm, which typically is not enough for a satisfactory interference cancellation. A further problem is that the processing delay to complete the search algorithm requires at least as many symbol periods as the number of stages or iterations. Also, the prior algorithms do not necessarily produce a definite result.

The approach disclosed in the U.S. Pat. No. 5,644,592 patent, for example requires a lot of hardware and does not guarantee that the algorithm will produce a definitive solution. The approach from the U.S. Pat. No. 5,719,852 patent also does not guarantee that the algorithm will identify an optimal solution for the search for the code or codes actually present in the received signal. The technique of U.S. Pat. No. 5,757,791 is a particularly complex approach and again, it does not produce a definitive solution to the search for the code or codes contained in the spread-spectrum signal.

Hence a need still exists for a more efficient and effective technique for analyzing correlation of a received signals to a plurality of possible codes that may be received from multiple users, to definitely identify the actual code set received at any given time.

SUMMARY OF THE INVENTION

Hence a general objective of the invention is to achieve a more effective technique for demodulating a potential plurality of codes in a received spread-spectrum signal to recover simultaneously transmitted data.

Another objective relates to performing the code recognition in a fashion that is much less hardware intensive than the prior art and requires less delay.

The inventive concepts alleviate the above noted problems in spread-spectrum communications and achieve the stated objectives by using a particular type of mathematical algorithm, specifically a Quasi-Newtonian optimization routine, to definitively solve a quadratic matrix equation and determine the one or more of the potential spreading codes actually received in the spread-spectrum signal. Although the process may require multiple iterations of the code search algorithm, all iterations flow from one set of actual signal correlations, i.e., for one symbol interval, which means that all iterations can be completed during a period no longer than a single symbol.

Hence a first aspect of the invention relates to a demodulator for a spread-spectrum receiver system. The demodulator simultaneously demodulates data from a plurality of possible spreading code sequences from a received spread-spectrum signal. The demodulator comprises a bank of comparators and a processor. The comparators, typically correlators or matched filters, receive and process the spread-spectrum signal. Each comparator determines a value representing a level of correlation of the received spread-spectrum signal to a respective one of the possible spreading code sequences. The processor executes an iterative process for solving a quadratic formulation based on the correlation values and the possible spreading code sequences for convergence on a Hessian function. This process identifies a set of the possible spreading code sequences contained within the received spread-spectrum signal, to recover user data. The preferred embodiment of this process is a Davidson-Fletcher-Powell (DFP) algorithm.

The processor may be a programmed processor, such as a digital signal processor (DSP) or possibly a microprocessor and/or math co-processor. Alternatively, the processor may be implemented using discrete components arranged to perform the necessary iterative computations.

Another aspect of the invention relates to a method for simultaneously demodulating data from a plurality of possible spreading code sequences from a received spread-spectrum signal. The method involves receiving a plurality of respective correlation values. Each received value represents the correlation of the received spread-spectrum signal to a respective one of the possible spreading code sequences. The inventive method also involves executing a plurality of iterations of a routine, preferably a Davidson-Fletcher-Powell (DFP) algorithm, for solving a quadratic matrix formulation based on the correlation values and the plurality of possible spreading code sequences for convergence on a Hessian function. The solution, found after a predetermined iteration of the execution of the routine, identifies a set of the possible spreading code sequences contained within the received spread-spectrum signal and thus user data carried by the identified codes.

The present inventions find particular application to recognition of multiple code sequence transmissions from multiple users, e.g. in a CDMA environment. However, the invention also is applicable to spread-spectrum communications, for example, for reception of a signal containing multiple spreading codes carrying multiplexed data from a single source.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 2 is a flow chart useful in understanding the process for implementing the inventive code sequence search technique in a programmed digital signal processor or the like.

DETAILED DESCRIPTION OF THE PRESENTLY PREFERRED EMBODIMENTS

The present invention uses a particularly powerful signal search technique to jointly detect a plurality of code sequence signals, based on the outputs of a matched filter bank or a correlator bank within a fixed number of iterations. The inventive code search technique finds particular application in a demodulator of a direct-sequence spread-spectrum receiver, such as a CDMA receiver or the like. The search algorithm used in the present invention is an adaptation of a Quasi-Newtonian optimization routine, preferably an adaptation of the routine commonly identified as the DFP algorithm. The term "DFP" refers to Davidson's Method modified via Fletcher and Powell or the Davidson-Fletcher-Powell method.

In general, such search methods are known as theoretical optimization techniques, for searching for a solution to a problem that can be expressed in a particular mathematical form. With the preferred approach adapted for use in a CDMA environment, assuming that N is the processing gain of the CDMA system, it is possible to guarantee a search result in N iterations through the search algorithm. Also, the algorithm works with a single set of outputs from a bank of correlators or matched filters, without the need to use new data from the correlators or matched filters in each stage of the iteration.

Figure 1:
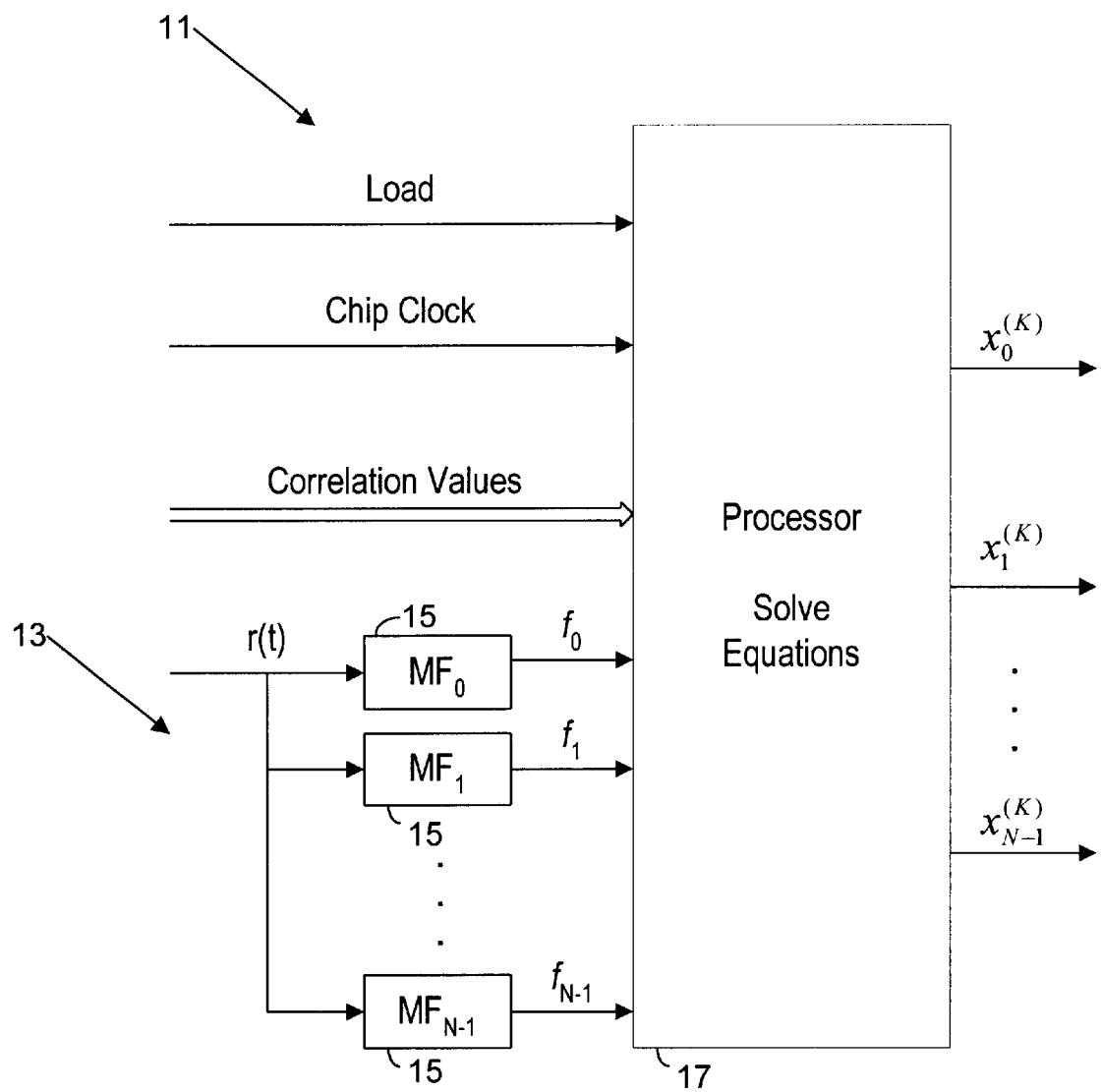
FIG. 1 is a functional block diagram of an embodiment of a spread-spectrum demodulator system, implementing a code sequence search technique in accord with the present invention.

It may be helpful at this point to consider an exemplary demodulator system, implementing the inventive code search. FIG. 1 shows the spread spectrum demodulator 11 for a receiver in a CDMA type spread-spectrum communication system. Such a demodulator 11, for example, might be utilized in a base station of a CDMA cellular network. Such systems are currently deployed to provide mobile telephone and data services, and 3-G versions thereof are planned for near-term future deployments to offer wide-band CDMA services.

The spread spectrum demodulator system 11 includes a bank 13 of comparison circuits for determining correlation of the input, that is to say the received spread-spectrum signal, to the set of possible spreading code sequences. The circuits or comparators in the bank of circuits 13 compare the digitized samples in bit stream, r(t), which is derived from the input spread-spectrum waveform, to a set of references. The bank of comparators 13 may comprise a group of correlators, for receiving and processing the spread-spectrum signal. Each correlator would determining a value representing the correlation of the received spread-spectrum signal to a respective one of the possible spreading code sequences In the preferred embodiment, the bank 13 comprises $MF_0$ to $MF_{N-1}$ matched filters 15. The matched filters 15 receive the input signal bit stream r(t) in parallel. A matched filter attempts to match the input to a reference signal, for example by multiplying the bits of the reference by a set of samples of the input signal and summing the results through an adder tree. Each matched filter 15 in the bank 13 attempts to match the input signal r(t) to a different one of the PN sequence codes that may be used in the spread-spectrum communication system.

The processor 17 also receives a set of cross-correlation values (shown by the block arrow) representing the known correlation between the PN codes that may be received in the particular spread-spectrum communication system.

Suppose, for example, that in a CDMA system the processing gain is N. Typically, such a system can support N simultaneous users. In this example, assume that the communications are synchronized. Stated another way, every user transmitting to the demodulator 11 starts code transmission at substantially the same time.

For each respective code, a matched filter 15 produces a correlation value f representing the detected degree of matching or correlation between the input signal and the respective reference code sequence. The bank of $MF_0$ to $MF_{N-1}$ matched filters 15 supplies the set of correlation values $f_0, f_1 \ldots f_{N-1}$ to a processor 17, which is programmed to perform an iterative process to identify the code sequence (s) contained within the input signal. For example, the processor 17 might use some form of minimum mean square error (MMSE) algorithm to determine a "best fit" of the input signal to possible combinations of PN codes that may be in the signal from the spread-spectrum communication system at any given time.

The processor outputs a column vector X of signals $x^{(k)}$ representing the magnitude information associated with each PN code sequence during the k th symbol interval. For example, during a given symbol period the $x_0^{(k)}$ output indicates the relative magnitude associated with the signal of the first user during k th symbol interval. This value can be used to judge if the associated user is active now and what is the transmitted bit, etc. Similar explanations can be applied to other outputs.

In accord with the invention, the processor 17 utilizes a Quasi-Newtonian optimization or search method, to jointly determine the "best fit" to a possible set of one or more PN codes contained in the currently received portion of the spread-spectrum signal. The processor 17 receives the correlation values from the matched filters 15, and solves a set of quadratic equations through an iterative process, to identify the codes contained within a symbol interval of a received spread-spectrum signal.

The processor receives a chip clock signal, for timing purposes. The processor 17 also receives a 'Load' signal, which serves as an instruction to load a set of correlation values from the matched filters 15 of the bank 13. In response to the Load signal, the processor 17 begins another cycle through the iterative algorithm to identify a set of codes.

Figure 2:
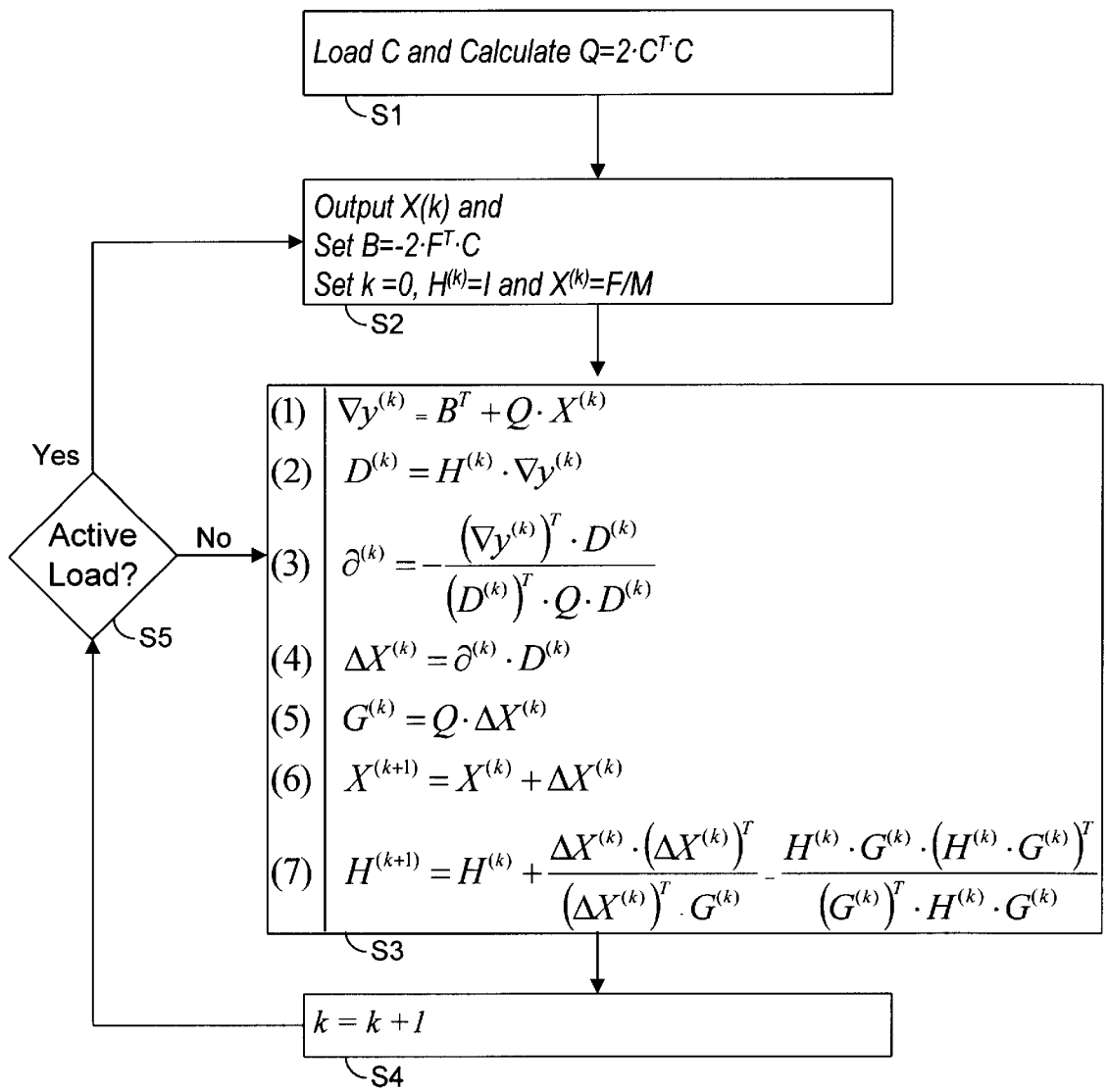

The processor 17 may be a programmable digital processor, programmed to execute a series of steps, for example to perform the program process flow shown in FIG. 2. Alternatively, the processor 17 may be implemented in hardware, for example in an ASIC chip circuit. In this later case, the processor would include the elements shown generally in functional block diagram form in FIG. 3. The specific implementations of FIGS. 2 and 3 will be discussed in more detail, later.

The theory of Quasi-Newtonian search methods is to approximate a Hessian function or its inverse by a matrix that is easy to calculate and perform a quadratic convergence to an optimum solution. A Hessian function is a matrix of second order derivatives. The convergence involves a search of possible outcomes in a vector direction relative to the matrix to progressively approach the actual Hessian function or its inverse. Quasi-Newtonian optimization techniques therefore start with a definite Hessian matrix, normally the identity matrix. The search begins with a line search, in a direction for which good results may be expected. An error value is calculated, the matrix of outcome data and the Hessian matrix are updated, and the routine is repeated. This procedure continues either through a finite a number of iterations or until the search produces a definite outcome.

The two most common Quasi-Newtonian techniques are the Broyden-Fletecher-Goldfar-Shanno (BFGS) method and the Davidson-Fletcher-Powell (DFP) method. The preferred embodiment of the present invention utilizes the DFP method. The DFP method approximates the Hessian using a secant rule.

The inventions involve application of such optimization techniques to joint code detection in spread spectrum communications. For simplicity, consider a synchronized spread spectrum system and assume the symbol clock has been correctly recovered. For this simple model, then the received signal can be described as $$r(t) = \sum_{i=0}^{N-1} x_j \cdot p_j(t)$$

where $x_j$ is the magnitude associated with the No.j user signal, whose spreading waveform is $p_j(t)$. The magnitude $x_j$ carries the actual data sequence of the particular user.

Suppose the No.i matched filter correspondingly matches to $p_i(t)$, then its output is:

$$f_i = \sum_{i=0}^{N-1} x_j \cdot <p_i(t), p_j(t)>$$

Where $\diamond$ stands for the correlation value between $p_i(t)$ and $p_j(t)$ over one symbol period.

If the user code sequence signals $p_j(t)$ of two users were orthogonal, there would be no correlation or interference between the signals at the receiver; and correlation of each received sequence signal to a matching reference signal by a matched filter 15 would be a maximum. If all of the spreading codes are orthogonal, that is the matching results would be, $$<p_i(t), p_j(t)> = \begin{cases} M, & \text{if } i = j \\ 0, & \text{if } i \neq j \end{cases}$$

Then $$\sum_{i=0}^{N-1} x_j \cdot <p_i(t), p_j(t)> = M \cdot x_i$$

and the solution is $x_i = f_i/M$, $i=0, \ldots, N-1$, where M is the maximum possible correlation value, $x_i$ is the output data and $f_i$ is the value from the $i^{th}$ matched filter 15.

However, in an actual CDMA system, the codes used are PN (pseudo-random noise) sequences, which are generally not orthogonal. Therefore there will be some relatively small amount of correlations among the codes themselves. Accordingly, solution to determine the matrix of received codes takes more effort, especially when the number of simultaneous users in the system is large. Usually, instead of seeking the direct solution of above equations, the processor finds the best solution based on some form of minimum mean square error (MMSE) solution process.

As noted the CDMA spread-spectrum system provides N possible PN sequence codes. There may be as many as N simultaneous users transmitting on the different PN code sequences. Typically, such a system will provide a processing gain of N or higher. Stated another way, the system design will typically require transmission of N chips of a PN code sequence for each bit or symbol of user data. The DFP method will guarantee an accurate calculation result in N iterations performed within one symbol interval.

For purposes of the inventive analysis, let $C_{i,j} = <p_i(t), p_j(t)>, i=0, \ldots, N-1$ and $j=0, \ldots, N-1$ Then we have, $$\sum_{j=0}^{N-1} C_{i,j} x_j = f_i, i = 0, \ldots, N-1$$

It is possible to convert this to a matrix expression, which takes the form CX=F, where $$C = \begin{bmatrix} C_{0,0} & \cdots & C_{0,M-1} \\ \vdots & \ddots & \vdots \\ C_{N-1,0} & \cdots & C_{N-1,M-1} \end{bmatrix}, X = \begin{bmatrix} x_0 \\ \vdots \\ x_{N-1} \end{bmatrix}, F = \begin{bmatrix} f_0 \\ \vdots \\ f_{N-1} \end{bmatrix}.$$

C is the matrix of possible correlations between the PN code sequences used in the communication system for the particular symbol period. X is the matrix of output data values corresponding to the detected received codes, that is to say the data received from the users over the wireless link. F is the matrix of correlation values actually produced as outputs by the matched filters 15 processing the received spread-spectrum signal during one symbol interval. To reach a solution, we want to minimize the error matrix y where:

$$y \equiv (CX-F)^T \cdot (CX-F)$$

This is a minimum mean square error approach, and takes the form of a quadratic matrix equation. Working with this matrix equation $$y = X^T \cdot C^T \cdot C \cdot X - 2 \cdot F^T \cdot C \cdot X + F^T \cdot F$$

Let $Q = 2 \cdot C^T \cdot C$, and $B = -2 \cdot F^T \cdot C$, then $y = \frac{1}{2} X^T \cdot Q \cdot X + B \cdot X + F^T \cdot F$ The optimum solution for the matrix of user data will be $$X = Q^{-1} \cdot B.$$

There are many methods to find $Q^{-1}$. From the point of view of implementation, the major consideration on choosing an algorithm is whether or not a method is stable and can find the optimum solution in a fixed number of steps. Based on such criteria, Applicants have found that the quasi-Newtonian techniques, particularly Davidson's Method modified via Fletcher and Powell (DFP) is the optimum choice. If the calculation precision is good enough, this method guarantees to generate the optimum solution in N steps with N variables in the above quadratic equations.

The basic idea is that instead of trying to solve for the code matrix $Q^{-1}$ directly, the DFP method builds a Hessian function $H_n = H_{n-1} + A_n + B_n, n=1. , , , N$ with the property that $$\sum_{n=1}^{N} A_n = Q^{-1} \text{ and } \sum_{n=1}^{N} B_n = -H_0.$$

The term $F^T \cdot F$ is a constant and it will be ignored without affecting the solution. Now it is possible to use the DFP algorithm to find the optimum solution to the acquisition of the multiple spreading codes (i.e. the matrix of user data X) in the spread-spectrum communication system. The basic flow is shown in FIG. 2.

As noted, the DFP method utilizes a Hessian matrix. H(k) is a Hessian function, that is to say a matrix of second order derivatives. On the first pass, the matrix $H^{(k)}$ will be approximated by an identity matrix.

With reference to FIG. 2, the process begins at step S1. In that step, the digital signal processor (DSP) implementation of the processor 17 receives a first 'Load' command. In response, the processor 17 will load the matrix C, and the processor will calculate $Q = 2 \cdot C^T \cdot C$.

In step S2, the processor 17 will output any existing value for the matrix $X^{(k)}$, for example from a prior execution of the DFP search algorithm. In step S2, the processor also will set $B = -2 * F^T * C$; and the processor will set $k=0$, $H^{(k)} = I$ and $X^{(k)}$=F/M, for the f values in the matrix F output from the matched filters 15 for the current symbol. In this notation, $H^{(k)}$ is the Hessian matrix, and on this the first pass, the Hessian matrix $H^{(k)}$ is approximated by an identity matrix I. The data matrix $X^{(k)}$ is first approximated by the F input matrix directed by the scalor value M.

In step S3, the processor 17 goes through a series of calculations to perform one iteration of the DFP search routine. First, $$\nabla y^{(k)} = B^T + Q \cdot X^{(k)} \quad (1)$$

The error vector $\nabla y^{(k)}$ takes the form of a column vector.

$$D^{(k)} = H^{(k)} \cdot \nabla y^{(k)} \quad (2)$$

$D^{(k)}$ takes the form of a row vector, which transposed into $(D^{(k)})^T$ forms a column vector as used subsequently. In matrix equation (2), the $D^{(k)}$ matrix is a function of the Hessian matrix multiplied by the error matrix. The $H^{(k)}$ matrix represents a search direction. In the initial pass, recall that this is an identity matrix. From the equation for $D^{(k)}$, we develop the following:

$$\partial^{(k)} = -\frac{(\nabla y^{(k)})^T \cdot D^{(k)}}{(D^{(k)})^T \cdot Q \cdot D^{(k)}} \quad (3)$$

Of note, the denominator is this equation becomes a scalor value. From this equation, we can determine a change in the X matrix for the user data, as follows:

$$\Delta X^{(k)} = \partial^{(k)} \cdot D^{(k)} \quad (4)$$

Then $$G^{(k)} = Q \cdot \Delta X^{(k)} \quad (5)$$

The next step in the optimization algorithm is the adjustment in the user data solution values for the X vector, as the search progresses. In this case, $$X^{(k+1)} = X^{(k)} + \Delta X^{(k)} \quad (6)$$

The next step involves updating the Hessian matrix as follows $$H^{(k+1)} = H^{(k)} + \frac{\Delta X^{(k)} \cdot (\Delta X^{(k)})^T}{(\Delta X^{(k)})^T \cdot G^{(k)}} - \frac{H^{(k)} \cdot G^{(k)} \cdot (H^{(k)} \cdot G^{(k)})^T}{(G^{(k)})^T \cdot H^{(k)} \cdot G^{(k)}} \quad (7)$$

In step S4, the processor 17 increments the value of k by one count (k=k+1). For example, in the first pass through the algorithm in step S3, the value of k was 0 because of the initialization thereof in step S2. After one iteration of step S3, step S4 will increase the value of k to 1. In step S5, the processor 17 determines if the load command is active. As part of this determination, the processor will determine if the value of k has increased to equal the value of N. If the load command is not active, for example if k<N, then the intent is to continue the processing in response to the current set of input values. Accordingly, the processing at step S5 returns to step S3.

In the second and subsequent passes through the routine, the calculations (1) to (7) in step S3 utilize the updated version of the matrix (H). These calculations start with the new values in the updated user data matrix X. Each iteration leads to a further update of these matrices. Through a successive number of iterations N, the matrix H will approach the Hessian matrix, as the error is minimized. At the same time, the values in the X matrix approach the optimum solution for the user data, in this case the matrix of user data corresponding to the PN sequences contained within the received spread spectrum signal.

As noted, the CDMA communications transmit one symbol or bit of data on N chips of a code sequence. The processor 17 therefore operates at speeds to perform N iterations of the search steps S3, S4, S5 within one symbol period. If the processing gain is N and there are at most N users, N iterations of the DFP search algorithm will achieve a definitive identification of the codes received in the symbol period and thus of the data received from the active users. After N iterations, k is no longer less than N, and the processing at step S5 branches back to step S2 (the new load is now 'active').

The branching back from S5 to S2 results in the output of the latest values calculated for the code recognition matrix $X^{(k)}$ containing the user data. The matrix $X^{(k)}$ contains the solutions found by the DFP algorithm after the N iterations, in this case the set of data carried by the possible codes found to be actually present on the received spread-spectrum signal.

At this new occurrence of the step S2, the processor 17 also loads in a new set of f values from the matched filters 15 as the new F matrix, and resets the other parameters, to initiate a new execution of the DFP search procedures through steps S3, S4 and S5. In this manner, each execution of the steps S2 to S5 will produce one matrix output $X^{(k)}$ containing output data for one symbol period of the received spread-spectrum signal.

Figure 3:
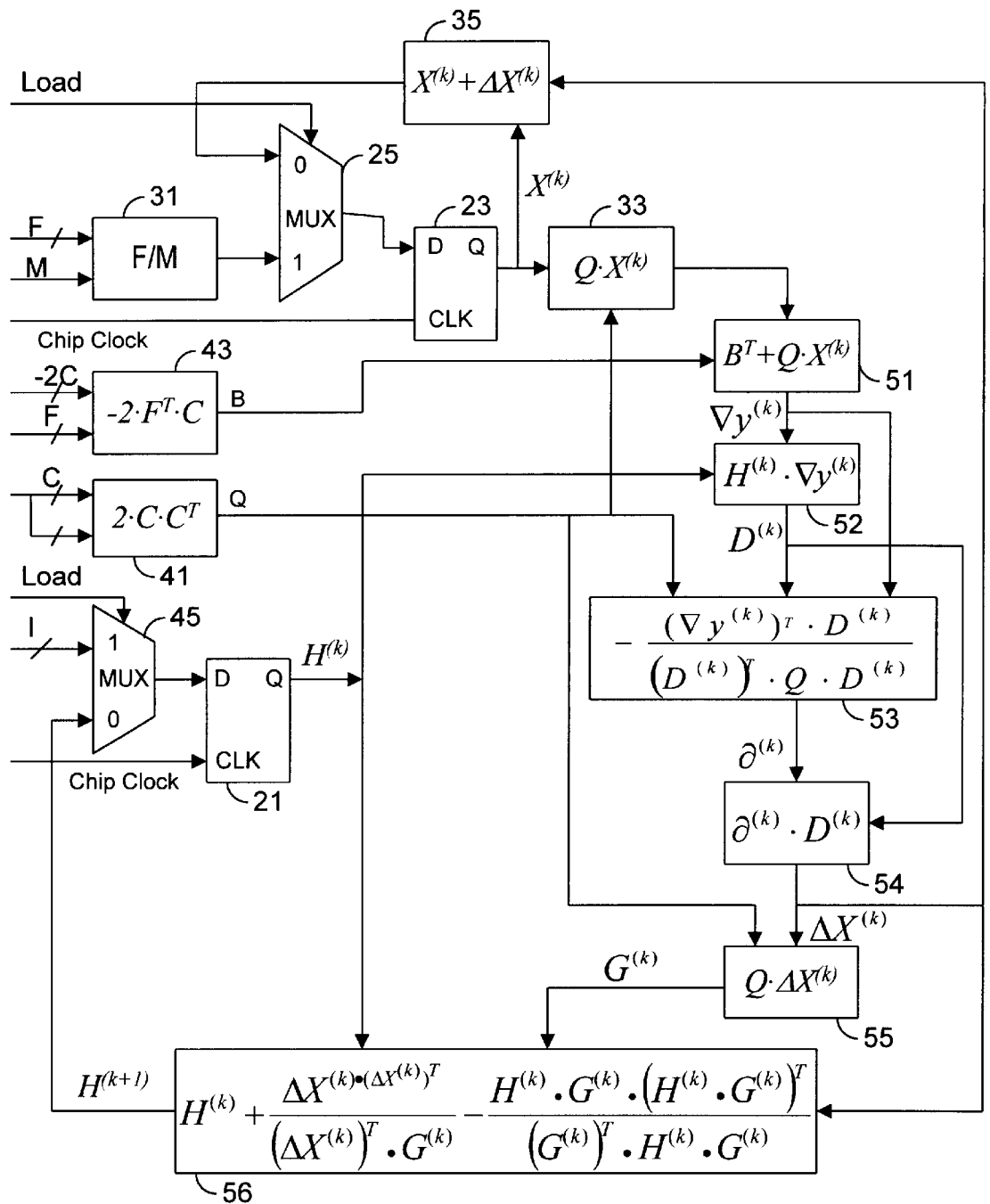
FIG. 3 is a functional block diagram useful in explaining a hardware implementation of a processor for performing the inventive code sequence search technique.

The flow chart of FIG. 2 illustrates the inventive demodulation technique assuming implementation of the processor 17 in a programmed device, typically a digital signal processor (DSP). It is also possible to implement the processor 17 in hardware form, for example using an ASIC design. The hardware implementation would execute the same functions as performed in the flow chart of FIG. 2. To understand the hardware implementation, FIG. 3 provides a high-level functional block diagram of the alternative form of the processor.

The processor must perform N iterations in N time slots defined by the chip clock. After N iterations, the processor will output the data in the X matrix. In FIG. 3, the chip clock is input to two banks of flip-flop circuits 21 and 23. The processor also receives the Load signal on a control input of a multiplexer 25.

The F matrix of f values from the matched filters 15 is received at a circuit 31, which performs a matrix division thereof with the scalor value of M. The output of the matrix division circuit 31 goes to one data input of the multiplexer 25. Based on the Load signal at its control input, the multiplexer 25 selectively outputs the weighted F/M matrix of correlation values or the updated data matrix. At a time determined by the chip clock, the flip-flops in bank 23 output the data from the multiplexer 25 as the matrix $X^{(k)}$. This matrix goes to a computation circuit 33 as well as to a data matrix update circuit 35, for updating the matrix $X^{(k)}$.

The correlation matrix C is supplied to the inputs of a circuit 41, for computation of the B matrix $2 \cdot C^T \cdot C$. A matrix computation circuit 43 receives the inverse of 2 times the C matrix as well as the F matrix and computes the Q matrix $-2 \cdot F^T \cdot C$.

A multiplexer 45 receives the identity matrix on one input and receives the updated Hessian (H) matrix on its other input and selectively by outputs an H matrix through the clocked flip-flop 21.

The hardware processor of FIG. 3 also includes a series of specially designed computation circuits 51–56. These circuits together with the circuit 35 perform the computations included within the step S3 as discussed in detail above relative to FIG. 2.

There are a number of advantages to the use of the DFP algorithm in a CDMA system or the like. For example, the complexity is proportional to N used in the system. Unlike prior art approaches, the inventive technique will find the best solution within N iterations during a single symbol interval. Also, the DFP method provides good performance when the correlation values between the known spreading codes (for the C matrix) can be pre-calculated, or can be easily obtained in real time. Therefore, it is particularly suited to use in synchronized CDMA systems and in circuit switched CDMA systems.

In an asynchronous CDMA system, the inventive code recognition technique can be applied as long as it is possible to calculate or estimate the potential correlation values in real time or have enough memory to store all the possible values and determine which ones should be used. Even if it is necessary to calculate these correlation values in real time, the required hardware is much less than that of using additional matched filters or correlator because a PN code has only 1 bit of modulated data instead of 4 bits or more.

A further advantage of the inventive approach is that it can run as many iterations as necessary within the processor, that is to say without any extra hardware requirements and without any increased delay. For example, if the process gain is 63 and there may be up to 63 users, we can run 63 iterations before output of the solution. If one iteration takes only one chip cycle, then there is delay of only one symbol period.

Persons skilled in spread-spectrum communications will recognize that the present invention admits of a variety of obvious modifications and adaptations to other communication applications.

For example, the above discussion has concentrated on application of the invention to joint detection or demodulation in a CDMA environment, for receiving simultaneous transmissions from multiple users. Those skilled in the art will recognize, however, that the invention is applicable to a variety of other types of spread-spectrum communications. For example, the PACKET-SWITCHED SPREAD-SPECTRUM SYSTEM disclosed in U.S. Pat. No. 5,862,133 divides an input data stream at a transmitter into a plurality of sub-channel data-sequence signals. Each sub-channel data-sequence signal is spread-spectrum processed with a code, into a spread-spectrum signal for a different sub-channel. The sub-channel spread-spectrum signals are combined and sent over a communications channel. At the receiver, the received signal is despread into the plurality of sub-channel data-sequence signals and multiplexed back to a stream of received data. If such a system utilizes different codes for spreading of the sub-channel data-sequence signals, particularly codes that are not fully orthogonal, it may be useful to utilize the inventive demodulation technique to jointly detect the codes and thus recover the sub-channel data.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the invention.

What is claimed is:

1. A demodulator for a spread-spectrum receiver system, for substantially simultaneous demodulation of data from a plurality of possible spreading code sequences from a received spread-spectrum signal, comprising:

a bank of comparators for receiving and processing the spread-spectrum signal, each comparator for determining a value representing a level of correlation of the received spread-spectrum signal to a respective one of the possible spreading code sequences; and a processor for receiving and processing the correlation values from the bank of comparators, the processor executing an iterative process for solving a quadratic formulation based on the correlation values and known characteristics of the plurality of possible spreading code sequences for convergence on a Hessian function, to identify a data set carried on the possible spreading code sequences contained within the received spread-spectrum signal.

2. A demodulator for a spread-spectrum receiver system as in claim 1, wherein the iterative process executed by the processor comprises a DFP algorithm.

3. A demodulator for a spread-spectrum receiver system as in claim 2, wherein the bank of comparators comprises a plurality of matched filters.

4. A demodulator for a spread-spectrum receiver system as in claim 2, wherein the processor comprises a digital processor programmed for executing a series of steps to complete a predetermined number of iterations of the DFP algorithm.

5. A demodulator for a spread-spectrum receiver system as in claim 4, wherein the programmed digital processor comprises a digital signal processor.

6. A demodulator for a spread-spectrum receiver system as in claim 2, wherein the processor comprises:

a first multiplexer for selectively outputting either a scaled matrix of the correlation values from the bank of comparators or an updated set of values, as a matrix representing user data;

a second multiplexer for selectively outputting either an identity matrix or an updated Hessian matrix; and circuitry for calculating an error matrix, determining a change in the matrix representing user data as a function of the error matrix and the Hessian matrix and updating the matrix representing user data and the Hessian matrix.

7. A demodulator for a spread-spectrum receiver system as in claim 2, wherein the known characteristics of the plurality of possible spreading code sequences comprise known correlations between the possible spreading code sequences.

8. A method for substantially simultaneously demodulating data from a plurality of possible spreading code sequences from a received spread-spectrum signal, comprising:

receiving a plurality of respective correlation values each representing the correlation of the received spread-spectrum signal to a respective one of the possible spreading code sequences;

executing a plurality of iterations of a routine for solving a quadratic matrix formulation based on the correlation values and known characteristics of the plurality of possible spreading code sequences for convergence on a Hessian function; and after a predetermined iteration of the execution of the routine, identifying from a solution of the quadratic matrix formulation a set of data represented by the possible spreading code sequences contained within the received spread-spectrum signal.

9. A method as in claim 8, wherein the executed iterative routine comprises a DFP algorithm.

10. A method as in claim 9, wherein the known characteristics of the plurality of possible spreading code sequences comprise known correlations between the possible spreading code sequences.

11. A demodulator for a spread-spectrum receiver system, for joint demodulation of data from a plurality of possible spreading code sequences from a received spread-spectrum signal, comprising:

- a bank of comparators for receiving and processing the spread-spectrum signal, each comparator for determining a value representing a degree of correlation of the received spread-spectrum signal to a respective one of the possible spreading code sequences; and
- a processor for receiving and processing the correlation values from the bank of comparators, the processor executing an iterative Quasi-Newtonian search analysis of the correlation values for identifying a data set modulated on a plurality of the possible spreading code sequences contained within the received spread-spectrum signal, wherein the Quasi-Newtonian search analysis executed by the processor comprises a DFP algorithm, and the processor comprises:

- a first multiplexer for selectively outputting either a scaled matrix of the correlation values from the bank of comparators or an updated set of values, as a matrix representing user data;
- a second multiplexer for selectively outputting either an identity matrix or an updated Hessian matrix; and
- circuitry for calculating an error matrix, determining a change in the matrix representing user data as a function of the error matrix and the Hessian matrix and updating the matrix representing user data and the Hessian matrix.

* * * * *